(12) United States Patent
Audouin

(10) Patent No.: US 8,881,511 B2
(45) Date of Patent: Nov. 11, 2014

(54) METHOD FOR REDUCING THE AMOUNT OF NOX IN THE EXHAUST GASES OF A MOTOR VEHICLE

(75) Inventor: Arnaud Audouin, Paris (FR)

(73) Assignee: Aaqius & Aaqius S.A., Geneva (CH)

( * ) Notice: Subject to any disclaimer, the term of this patent is extended or adjusted under 35 U.S.C. 154(b) by 150 days.

(21) Appl. No.: 13/812,134

(22) PCT Filed: Jul. 18, 2011

(86) PCT No.: PCT/IB2011/001696
§ 371 (c)(1),
(2), (4) Date: May 8, 2013

(87) PCT Pub. No.: WO2012/014037
PCT Pub. Date: Feb. 2, 2012

(65) Prior Publication Data
US 2013/0213011 A1     Aug. 22, 2013

(30) Foreign Application Priority Data
Jul. 28, 2010 (EP) ..................... 10007831

(51) Int. Cl.
*F01N 3/20* (2006.01)
*F01N 9/00* (2006.01)

(52) U.S. Cl.
CPC . *F01N 9/00* (2013.01); *Y02T 10/24* (2013.01); *Y02T 10/47* (2013.01); *F01N 2610/10* (2013.01); *F01N 2900/1811* (2013.01); *F01N 2610/06* (2013.01); *F01N 2610/02* (2013.01); *F01N 2900/1808* (2013.01); *F01N 3/208* (2013.01)
USPC ................... 60/295; 60/274; 60/286; 60/320

(58) Field of Classification Search
USPC ................... 60/274, 286, 295, 301, 303, 320
See application file for complete search history.

(56) References Cited

U.S. PATENT DOCUMENTS

2002/0056273 A1* 5/2002 Itoh et al. ................... 60/286
2011/0286302 A1 11/2011 Welker et al.

FOREIGN PATENT DOCUMENTS

| GB | 2400662 A | 4/2003 |
|---|---|---|
| GB | 2414804 A | 12/2005 |
| WO | WO 02/059650 A1 | 8/2002 |
| WO | WO 2005/096018 A1 | 10/2005 |

* cited by examiner

*Primary Examiner* — Thomas Denion
*Assistant Examiner* — Jorge Leon, Jr.
(74) *Attorney, Agent, or Firm* — Blakely Sokoloff Taylor & Zafman

(57) ABSTRACT

The invention relates to a method for controlling a system for reducing the amount of NOx in the exhaust gases of a motor vehicle. The system comprises a storage chamber (8) which contains a pollutant-removing agent and which is arranged such that the temperature thereof is controlled by a heating device (9). The system further comprises a supply module (6) arranged so as to inject the pollutant-removing agent into the exhaust gases, the supply module (6) comprising a device for measuring the pressure (6a) or the temperature inside the storage chamber (8), as well as a device (6b) for proportioning the pollutant-removing agent. The control method involves, for example: defining a predetermined moving criterion, in particular on the basis of the engine torque during a first period; filtering the moving criterion with a filtering period (T1) corresponding to the first period; comparing the filtered moving criterion with various thresholds in order to determine a type of moving; determining the elapsed time for each type of moving during a second period (T2) in order to associate a trend representing moving conditions throughout said second period; calculating a set pressure or set temperature according to the type and the trend representing past moving conditions; comparing the set pressure or set temperature with the pressure or temperature measured by the pressure- or temperature-measuring device (6a); and heating the storage chamber (8) if the pressure or temperature inside the latter is lower than the set pressure or set temperature.

12 Claims, 4 Drawing Sheets

|  | Severe urban | Average urban | Rural road | Mountain | Motorway |
|---|---|---|---|---|---|
| Motorway | P₁₄ | P₂₄ | P₃₄ | P₄₄ | P₅₄ |
| Rural road | P₁₃ | P₂₃ | P₃₃ | P₄₃ | P₅₃ |
| Urban | P₁₂ | P₂₂ | P₃₂ | P₄₂ | P₅₂ |
| Mixed | P₁₁ | P₂₁ | P₃₁ | P₄₁ | P₅₁ |

Fig. 7

METHOD FOR REDUCING THE AMOUNT OF NOX IN THE EXHAUST GASES OF A MOTOR VEHICLE

This is a non-provisional application claiming the benefit of International Application Number PCT/IB2011/001696 filed Jul. 18, 2011.

The proposed invention concerns the automotive industry and more particularly concerns a method for controlling a system intended to reduce the amount of NOx in motor vehicle exhaust gases.

Transport-related pollutant emissions have for nearly thirty years been at the forefront for prompting progress in the industry. Increasingly more severe emission limits for the four regulated pollutants (CO, HC, NOx, particles) have allowed a significant improvement in air quality, in particular in large cities.

The ever increasing use of motor vehicles requires continued efforts to further reduce these pollutant emissions. Therefore the reduction of nitrogen oxides (NOx) remains a complex problem within the context of more severe European thresholds expected in 2015 when the Euro 6 standard comes into force. To have available highly efficient depolluting technologies under all driving conditions remains a major challenge for the transport industry.

Secondly, fuel consumption directly linked with $CO_2$ emissions has become a major concern. For example regulations will be introduced at European level on and after 2012 relating to passenger vehicle $CO_2$ emissions. It is henceforth accepted that this limit will be regularly lowered over the coming decades. $CO_2$ reduction has therefore become an obvious necessity for the entire transport industry.

This dual issue of reducing local pollution (NOx) and reducing fuel consumption ($CO_2$) raises particular difficulties for diesel engines whose lean-burn combustion is accompanied by NOx emissions that are difficult to treat.

Devices already exist which allow a reduction in NOx quantities by means of a SCR catalyzer (Selective Catalytic Reduction) via ammonia stored in storage material of salt type e.g. alkaline-earth chlorides. The injection of ammonia into exhaust gases is controlled by means of a heating device used to heat the storage material to allow a reversible absorption/desorption reaction of ammonia, since this reaction is directly related to the temperature within the storage material.

It is the objective of the present invention to propose a method for limiting the energy consumption of the heating device whilst ensuring sufficiently high pressure within the storage material to allow a sufficient injection rate that is compatible with NOx emissions.

According to the invention, this objective is achieved by means of a method for controlling a system intended to reduce the quantity of NOx in the exhaust gases of a motor vehicle. The system, on-board a motor vehicle, comprises a storage chamber containing a pollutant-removing agent, a heating device arranged to control the temperature of the storage chamber, and a feed module arranged to inject the pollutant-removing agent into the exhaust gases. The feed module comprises a device for measuring the pressure or temperature inside the storage chamber and a device for proportioning the pollutant-removing agent. The method of the invention comprises the following steps:

a) calculating, when the motor vehicle is in operation and for a predetermined driving period, a set pressure or temperature in the storage chamber (8) in accordance with one or more parameters of the motor vehicle which relate to a type of driving of the vehicle during this period;

b) comparing the set pressure or temperature with the pressure or temperature measured by the pressure or temperature measuring device (6a) during operation of the motor vehicle, after the driving period; and c) heating the storage chamber (8) if the pressure or temperature therein is lower than the set pressure or temperature.

To determine the set pressure or temperature in the storage chamber during the predetermined driving period, step a) preferably comprises the following operations:

d) defining a vehicle driving criterion as a function of different parameters of the motor vehicle during a first period (T1) of operation of said vehicle that is significantly shorter than said predetermined driving period;

e) determining the mean of the driving criterion during the first operating period (T1) of the motor vehicle, f) comparing this mean driving criterion with different thresholds to determine a present type of driving of the motor vehicle during the first period (T1) from among several types of driving;

g) allocating a set pressure or temperature in relation to the present type of driving and/or to a pattern representing past driving conditions, said pattern of past driving conditions being determined by an additional operation which consists of determining the time spent by the motor vehicle on each type of driving during a second operating period (T2) of the motor vehicle corresponding to said predetermined driving period.

According to one preferred embodiment of the invention, the mean driving criterion during the first operating period (T1) of the motor vehicle is compared with at least three and preferably five different thresholds so that it is possible respectively to determine at least three and preferably five types of driving. Also, according to this preferred embodiment, three driving patterns are determined for the second operating period (T2) of the motor vehicle respectively corresponding to urban, rural road and motorway driving. Optionally a so-called mixed pattern can be added when no type of driving is predominant during this second period (T2). Finally, the system is adapted so that the set pressure is able to vary, preferably between 1 and 15 bars, so as to cause the flow rate of ammonia to vary over a range of 0.5 mg/s to 50 mg/s.

The characteristics of the invention will become better apparent on reading the description of this preferred embodiment, given solely as an example which is in no way limiting with reference to the schematic Figures in which.

Figure 3:
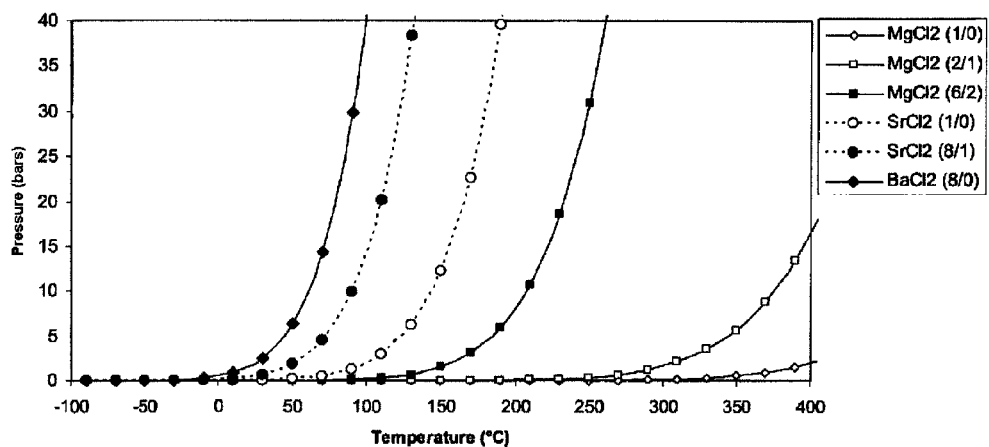
Figure 4:
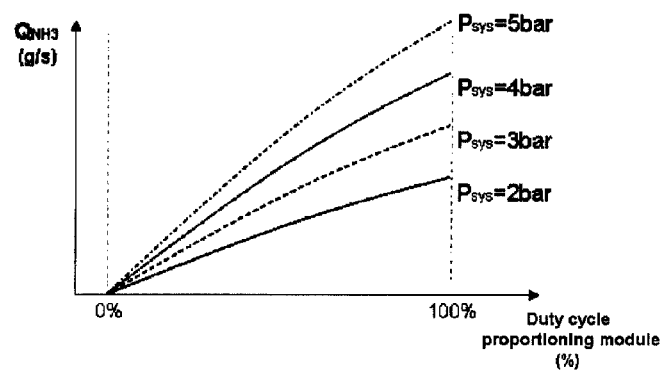
Figure 5:
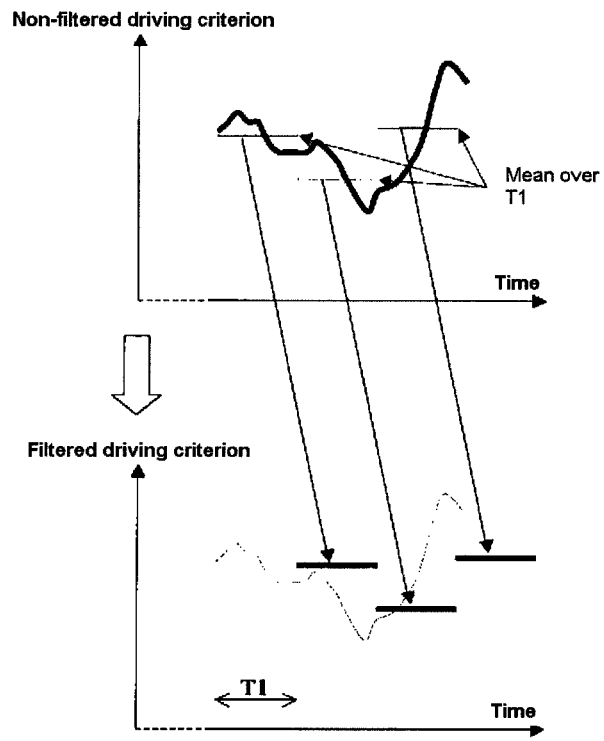
Figure 6:
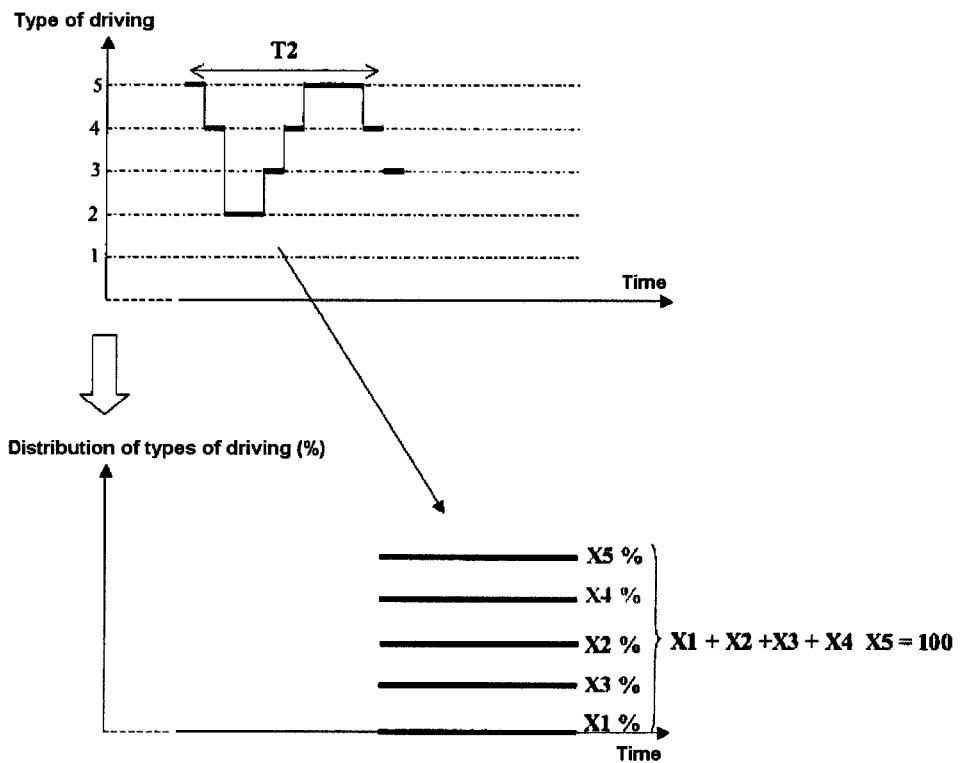

FIG. 3 gives the absorption/desorption equilibrium curves of ammonia in three salts of alkaline-earth metal chloride type;

FIG. 4 is a map showing the control of the proportioning device for a varying system pressure;

FIG. 5 illustrates the principle for computing the driving criterion;

FIG. 6 illustrates the principle for computing the driving pattern criterion;

FIG. 7 illustrates mapping of the set pressure according to driving type and to representative driving pattern.

According to this preferred embodiment of the invention, the control method is adapted to a device for selective catalytic reduction (SCR) of NOx emitted by exhaust gases from a vehicle engine.

Figure 2:
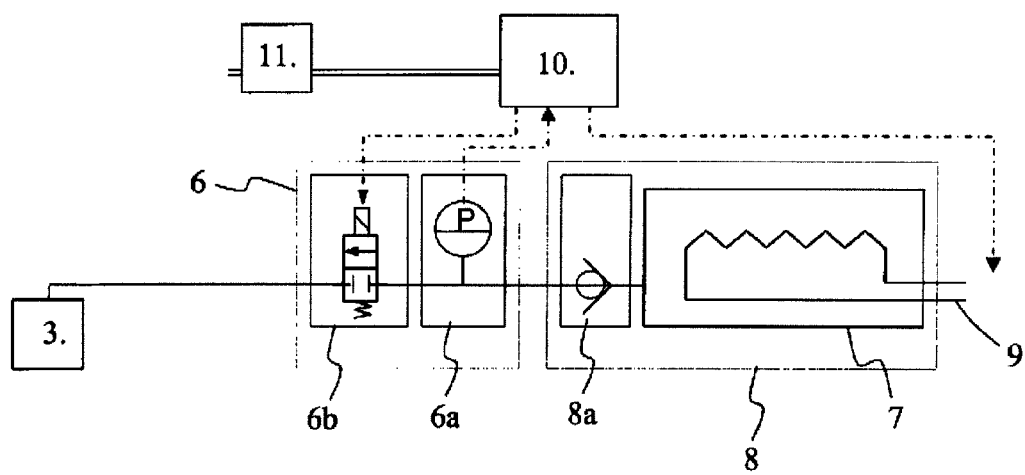
FIG. 2 illustrates the functional architecture of the ammonia storage and feed system.

According to FIG. 2 the system comprises a storage chamber 8 containing a pollutant-removing agent and arranged so that its temperature is controlled by a heating device 9. The system also comprises a feed module 6 arranged to inject the pollutant-removing agent into the exhaust gases, the feed module 6 comprising a device 6a for measuring the pressure or temperature inside the storage chamber 8 and a device 6b for proportioning the pollutant-removing agent. The control method of the invention consists for example of: defining a driving criterion determined in particular in relation to the engine torque during a first period; filtering the driving criterion with a filtering period T1 corresponding to the first period (FIG. 5); comparing the filtered driving criterion with different thresholds in order to determine a type of driving; determining the time spent on each type of driving during a second period T2 to associate a pattern representing driving conditions during this second period (FIG. 6); calculating a set pressure or temperature in relation to driving type and to a pattern representing past driving conditions; comparing the set pressure or temperature with the pressure or temperature measured by the device 6a for measuring pressure or temperature; heating the storage chamber 8 if the pressure or temperature therein is lower than the set pressure or temperature.

Figure 1:
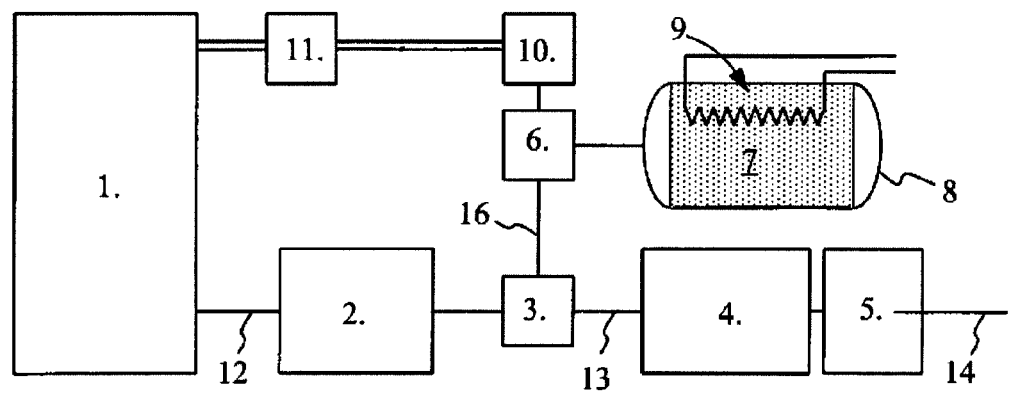
FIG. 1 illustrates the structural architecture of an ammonia storage and feed system.

More particularly according to FIG. 1, the engine 1 is controlled by en electronic computer 11. At the output from the engine the exhaust gases 12 are directed towards a first pollutant-removing element 2 which may be formed by an oxidation catalyst or a three-way catalyst and optionally a particle filter.

The ammonia 16 is injected by means of an injection module 3 into the exhaust downstream of the first pollutant-removing element 2 and is mixed with the exhaust gases. The ammonia/exhaust gas mixture 13 then passes through a SCR catalyzer 4 which allows the reduction of NOx via the ammonia. Various additional post-treatment elements 5 can be positioned after the SCR catalyzer such as a particle filter or oxidation catalyst. The depolluted exhaust gases 14 are then directed towards the exhaust outlet.

To ensure the feed and proportioning of ammonia 16, the ammonia storage chamber 8 contains a storage material 7 and is arranged so that its temperature can be controlled by the heating device 9 which may be in the form of an electric resistance or a heat exchanger supplied with a heat-exchange fluid such as the engine coolant. According to the present invention, the ammonia is preferably stored in a salt of alkaline-earth metal chloride type ($MgCl_2$, $SrCl_2$, $CaCl_2$, $BaCl_2$, etc.)

In the proposed system, the storage of ammonia is based on a reversible solid-gas reaction of the type:

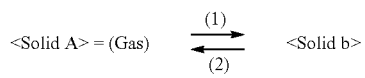

With alkaline-earth chlorides, ammonia forms coordination complexes also called ammoniacates. This phenomenon is known and abundantly described in the literature.

For example, the reactions of ammonia with strontium chloride are:

$SrCl_2+NH_3(g) \Leftrightarrow Sr(NH_3)Cl_2$
$Sr(NH_3)Cl_2+7NH_3 \Leftrightarrow Sr(NH_3)_8Cl_2$ (s)

and for ammonia with Barium chloride, a single reaction:

$BaCl_2+8 NH_3(g) \Leftrightarrow Ba(NH_3)_8Cl_2$ (s)

The chemical absorption of the ammonia ligand by the absorbent $SrCl_2$ and $BaCl_2$ causes a transfer of electrons between the solid and the gas, which translates as chemical bonds between $NH_3$ and the outer layer of the atoms of $SrCl_2$ and $BaCl_2$. The entry of the gas into the structure of the solid occurs within the entirety of its mass via a diffusion process. This reaction is fully reversible, absorption being exothermic and desorption endothermic.

During this reaction, the fixing of the gas by the solid is accompanied by an increase in volume, the octa-ammoniacate then occupying a much greater volume than the volume of the pure salt (up to a ratio of 4 to 5 times). The increase in the volume of the salt is due not only to expansion of its crystalline lattice but also to fractionating thereof thereby leaving free space between the microcrystals of $Sr(NH_3)_8Cl_2$ and $Ba(NH_3)_8Cl_2$.

Most salts desorb ammonia in stages as a function of their coordination sites. With regard to Strontium chloride seven molecules of ammonia are initially desorbed, and a last ammonia molecule at a second stage. The ammonia absorption/desorption equilibrium curve of the salts is defined as a function of temperature and pressure via the Clausius-Clapeyron equation:

$$\ln P_{NH3} = \frac{-\Delta Hr}{RT} + \frac{\Delta Sr}{R}$$

where $\Delta Hr$ represents enthalpy and $\Delta Sr$ the entropy of formation of the ammonia/salt complex for the stoichiometry under consideration.

The table below gives the enthalpy and entropy formation values taken from the scientific literature for the salts $MgCl_2$, $SrCl_2$ and $BaCl_2$.

| Salt | Equilibrium | Enthalpy (J/mol) | Entropy (J/mol · K) |
| --- | --- | --- | --- |
| $NH_3$ | (L/G) | 23 336 | 193 |
| $MgCl_2$ | (6/2) | 55 660 | 231 |
|  | (2/1) | 74 911 | 230 |
|  | (1/0) | 87 048 | 231 |
| $SrCl_2$ | (8/1) | 41 431 | 229 |
|  | (1/0) | 48 123 | 230 |
| $BaCl_2$ | (8/0) | 37 665 | 227 |

The equilibrium curves of ammonia absorption/desorption in these three salts are illustrated in FIG. 3. These absorption and desorption phenomena are fully reversible. It is then possible to store the ammonia in these salts for SCR application. The ammonia is injected into the exhaust for depollution after desorption of the salts, this desorption being guided by controlling temperature and/or pressure within the storage chamber 8.

According to FIG. 2, this storage chamber 8 is connected to the feed and proportioning device 6. This device 6 can be driven by an electronic controller 10 connected to the electronic computer of the engine 11. In another configuration, the feed and proportioning module 6 can be directly controlled by the engine computer 1 according to the principle of the invention.

According to FIG. 2, the ammonia storage chamber 8 comprises an interface 8a which allows the ensured secure connection between the storage chamber 8 and the feed module 6. This is composed of a pressure sensor 6a and an ammonia proportioning device 6b.

According to the invention, the ammonia proportioning device 6b is controlled in relation to a certain number of engine and vehicle parameters derived from the engine computer 11 which are used in combination with the data to allow optimized controlling of the heating device 9.

The term "system pressure" will be used to designate the pressure prevailing during operation inside the storage and feed system including the storage chamber 8, the connection interface 8a, the pressure sensor 6a and the ammonia proportioning device 6b. This system pressure is directly related to the temperature inside the storage chamber 8 via the Clausius-Clapeyron equation defined above.

The pressure of the system when in operation may vary as a function of the outer temperature and/or heating applied to the storage chamber over a pressure range of between 1 and 15 bar.

To limit the energy consumption of the heating device, it is sought to limit the system pressure as far as possible. On the other hand, the system pressure must be sufficiently high to allow a sufficient injection rate compatible with NOx emissions of the engine.

In the present invention, the set pressure is determined dynamically in relation to analysis of a certain number of engine and vehicle parameters such as the concentration of NOx emitted at any one time (magnitude able to be measured and/or modelled), the temperature of the engine lubricant, the temperature of the engine coolant, vehicle speed, engine speed, engine load or a combination of these parameters.

A preferred embodiment is described below for this analysis of present driving conditions (driving type criterion) and past driving conditions (driving pattern criterion) which allows a precise breakdown of the different life phases of a vehicle and offers extensive freedom for defining of the set pressure.

At a first stage a driving criterion is defined by the equation:

$$\text{Driving criterion} = \text{vehicle speed} \times (1 + K \times \text{CMI})$$

where CMI is the mean engine torque and K is the correction coefficient of engine torque allowing integration of the weight/power ratio, consideration of differences between vehicles having manual gearboxes or automatic gearboxes, and thereby best characterization of each type of driving (a parameter which can be calibrated for each application).

As illustrated in FIG. 5, the unprocessed driving criterion is then filtered with a first calibratable period T1 to obtain a mean driving criterion for period T1. Therefore every T1 seconds a new value is collected relating to the driving criterion which will remain valid for T1 seconds.

The type of driving is then defined by comparing the filtered driving criterion with calibratable thresholds in the following manner:

If filtered driving criterion (t)<Criterion threshold 1
    Type of driving=1 (urban, severe)
If criterion threshold 1≤filtered driving criterion (t)<Criterion threshold 2
    Type of driving=2 (urban, average)
If criterion threshold 2≤filtered driving criterion (t)<Criterion threshold 3
    Type of driving=3 (rural road)
If criterion threshold 3≤filtered driving criterion (t)<Criterion threshold 4
    Type of driving=4 (mountain)
If criterion threshold 4≤filtered driving criterion (t)
    Type of driving=5 (motorway)

The time spent on each type of driving condition during a second period T2 five times longer than period T1 is then calculated. This gives a vector of five values X1 to X5 whose sum is 100 (FIG. 6).

On the basis of the distribution of the types of driving conditions at time t, a pattern is associated representing past driving conditions. The number of patterns is limited to 3 (urban, rural road and motorway) to which a "mixed" pattern is added when no type of driving is predominant. The rules for determining pattern are the following:

If X1+X2>Urban pattern threshold
    Driving pattern=1 (urban)
If X3+X4+X5>Fast Pattern Threshold
    If X3+X4>Rural road pattern threshold
        Driving pattern=2 (rural road)
    Otherwise
        Driving pattern=3 (motorway)
Otherwise
    Driving pattern=0 (mixed)
    For reasons of coherency the following rules are applied:
    Urban Pattern Threshold>50%
    Fast Pattern Threshold>50%
    Rural Road Pattern Threshold<Fast Pattern Threshold The driving pattern is re-initialized as soon as the engine is stopped. There being no distribution of driving types during the first T2 seconds, the driving pattern is systematically initialized at 2 (rural road).

In the present invention, it is proposed to determine the set pressure as a function of this analysis of present and past driving conditions. Therefore, the set pressure is calculated by mapping such as illustrated in FIG. 7 in relation to criteria of the type of driving and driving pattern. Therefore, the demand for ammonia flow at a given system pressure, measured by device 6a, is converted to a duty cycle of the proportioning device in relation to this mapping.

The analysis of present and past driving conditions allows a precise breakdown of the different life phases of a vehicle and is well adapted to calculating ammonia pressure. For example, for a vehicle whose past and present conditions are severe urban, there is little advantage in ensuring a high system pressure, the flow rates of $NH_3$ required for treating the NOx emitted under these driving conditions being relatively low. On the other hand, for a vehicle whose past is urban and present is rural road, it would appear to be of advantage to increase the system pressure so as to provide for the high $NH_3$ flow rates required under these driving conditions.

It is to be noted that it is the calibration of calculation for criteria of driving type and driving pattern (T1, T2, X1, X2 . . . ) which allows optimized controlling of the set pressure over time i.e. sizing as accurately as possible the energy consumption related to heating of the system. It is to be noted that this calibration must also take into account the system's response time i.e. the response time between an increase in the set system pressure and the reaching of this system pressure.

In the present invention, $\Delta P_{eq}$ defines the pressure difference between $P_{set}$, the set pressure determined using the above strategies, and $P_{system}$ the pressure measured by the pressure sensor 6a:

$$\Delta P_{eq} = P_{set} - P_{system}$$

When $\Delta P_{eq} < 0$: no heating necessary
When $\Delta P_{eq} > 0$: actuation of heating system required
In the present invention, the power of the heating system is controlled via mapping dependent on the system pressure $P_{system}$ and the pressure difference $\Delta P_{eq}$. This mapping is to be calibrated for the system used and for the desired response time. In this manner mapping is determined of the "rise in temperature of the ammonia storage and feed system".

It is to be noted that it is also possible to control the power of the device by means of $T_{system}$ and $\Delta T_{eq}$ mapping, these 2 magnitudes able to be calculated directly from the values of system pressure ($P_{system}$) and pressure difference ($\Delta P_{eq}$) using the Clausius-Clapeyron equation.

Also to be noted is that this pressure (or temperature) mapping can be determined experimentally on the system used since it depends on a large number of parameters: heat loss in the system (advantage of insulating the storage chamber), heating system (electric, heat-exchange fluid), graphite/salt composite matrix (type of salt, binder density, conductivity and permeability, etc.).

The invention claimed is:

1. A method for controlling a system intended to reduce an amount of NOx in exhaust gases of a motor vehicle, the system comprising on-board the motor vehicle:
   a storage chamber (8) containing a pollutant-removing agent;
   a heating device (9) arranged to control a temperature of the storage chamber (8);
   a feed module (6) arranged to inject the pollutant-removing agent into the exhaust gases, and comprising:
      a device (6a) for measuring pressure or temperature inside the storage chamber (8); and
      a device (6b) for proportioning the pollutant-removing agent; the method comprising the following steps:
   a) calculating, when the motor vehicle is in operation and for a predetermined driving period, a set pressure or temperature inside the storage chamber (8) according to one or more parameters of the motor vehicle which are a function of a type of driving of said motor vehicle during said predetermined driving period;
   b) comparing the set pressure or temperature with the pressure or temperature measured by the pressure or temperature measuring device (6a) during operation of the motor vehicle, after said predetermined driving period; and
   c) heating the storage chamber (8) if the pressure or temperature therein is lower than the set pressure or temperature.

2. The method according to claim 1 wherein step a) to calculate the set pressure or temperature in the storage chamber (8) during the predetermined driving period comprises the following operations:
   d) defining a driving criterion of the motor vehicle as a function of different parameters of the motor vehicle during a first operation period (T1) of said motor vehicle that is significantly shorter than said predetermined driving period;
   e) determining a mean driving criterion during the first operation period (Ti) of the motor vehicle;
   f) comparing said mean driving criterion with different thresholds to determine a type of driving of the motor vehicle during the first period (T1) from among several types of driving, and
   g) allocating a set pressure or temperature as a function of the determined type of driving and/or a pattern representing past driving conditions, said pattern of past driving conditions being determined by an additional operation which includes determining a time spent by the motor vehicle on each type of driving during a second operation period (T2) of the motor vehicle corresponding to said predetermined driving period.

3. The method according to claim 1, wherein a driving criterion is determined as a function of at least two parameters chosen from among engine torque, a weight/power ratio of the motor vehicle, and a type of gearbox namely whether a manual or automatic gearbox.

4. The method according to claim 1, wherein a mean driving criterion during a first operation period (T1) of the motor vehicle is compared with at least three different thresholds so that it is possible to determine three types of driving.

5. The method according to claim 4 wherein the mean driving criterion during the first operation period (T1) of the motor vehicle, is compared with five different thresholds so that it is possible to determine five types of driving.

6. The method according to claim 1 wherein three driving patterns during a second operation period (T2) of the motor vehicle, respectively correspond to urban, rural road and motorway driving.

7. The method according to claim 6 wherein a mixed pattern is added when no type of driving predominates during the second operation period (T2) of the motor vehicle.

8. The method according to claim 1 wherein the pollutant-removing agent is ammonia.

9. The method according to claim 1 wherein the device for pressure or temperature measurement measures the set pressure varying between 1 and 15 bars to vary a flow rate of ammonia over a range of 0.5 mg/s to 50 mg/s.

10. The method according to claim 1 wherein the set pressure or temperature is determined as a function of a concentration of NOx in the exhaust gases.

11. The method according to claim 1 wherein the set pressure or temperature is determined as a function of vehicle speed and/or engine load and/or engine speed during the predetermined driving period.

12. The method according to claim 1 wherein the set pressure or temperature is determined as a function of a temperature of an engine lubricant and/or of a temperature of an engine coolant during the predetermined driving period.

* * * * *